United States Patent
Cartwright

[11] Patent Number: 5,167,126
[45] Date of Patent: Dec. 1, 1992

[54] REFRIGERANT RECOVERY AND RECYCLING ASSEMBLY

[75] Inventor: John P. Cartwright, Dallas, Tex.
[73] Assignee: CJS Enterprises, Inc., Dallas, Tex.
[21] Appl. No.: 626,555
[22] Filed: Dec. 12, 1990
[51] Int. Cl.$^5$ .................................................. G01K 13/00
[52] U.S. Cl. ........................................ 62/129; 62/292; 62/149; 62/475; 62/470
[58] Field of Search .................... 62/77, 85, 129, 149, 62/292, 474, 475, 470; 73/23.23, 29.03, 31.03, 64.2

[56] References Cited

U.S. PATENT DOCUMENTS

| | | | |
|---|---|---|---|
| 2,149,358 | 3/1939 | Miller | 62/470 |
| 3,212,284 | 2/1964 | Henderson et al. | 62/149 |
| 3,232,070 | 2/1966 | Sparano | 62/149 |
| 4,261,178 | 4/1981 | Cain | 62/149 |
| 4,285,206 | 8/1981 | Koser | 62/149 |
| 4,363,222 | 12/1982 | Cain | 62/149 |
| 4,476,688 | 10/1984 | Goddard | 62/149 |
| 4,539,817 | 9/1985 | Staggs | 62/149 |
| 4,646,527 | 3/1987 | Taylor | 62/149 |
| 4,768,347 | 9/1988 | Manz et al. | 62/149 |
| 4,805,416 | 2/1989 | Manz et al. | 62/292 |
| 4,809,520 | 3/1989 | Manz et al. | 62/292 |
| 4,862,699 | 9/1989 | Lounis | 62/292 |
| 4,878,356 | 11/1989 | Punches | 62/149 |
| 4,903,499 | 2/1990 | Merritt | 62/149 |
| 4,934,390 | 6/1990 | Sapp | 62/77 |

*Primary Examiner*—John Sollecito
*Attorney, Agent, or Firm*—William David Kiesel; Robert C. Tucker

[57] ABSTRACT

An apparatus for recovering and recycling used refrigerants from automotive air conditioning systems and similar air conditioning systems is disclosed having a unique cleaning assembly, a unique coolable storage means, and for recharging recycled refrigerant a unique metering means, as well as gauge assembly for measuring the amount of gas contaminates in the used refrigerants.

51 Claims, 3 Drawing Sheets

REFRIGERANT RECOVERY AND RECYCLING ASSEMBLY

BACKGROUND OF THE INVENTION

1. Field of the Invention

This invention relates in general to devices which can recover and recycle, or recover, recycle and recharge refrigerants, and more particularly to a device which can recover, recycle and recharge refrigerants such as R-12 from air conditioning systems used in automobiles, trucks and similar vehicles.

2. Prior Art

With the recognition of the importance of the ozone layer in the Earth's atmosphere, and that chlorofluorocarbons (CFC) which were being emitted into the atmosphere were primarily responsible for the depletion of the ozone layer, concerted efforts have been and are being made to reduce the amount of CFC being emitted into the atmosphere.

One major source of CFC being emitted into the atmosphere is the refrigerant R-12 used in air conditioning systems found in automobiles, trucks and other vehicles. As a result of the recognition of this particular problem various standards have been set by both Underwriters Laboratories (UL) and the Society of Automotive Engineers (SAE) for the procedure and equipment characteristics to be used in the recovery and purification of R-12 in refrigerant systems, rather than to simply vent the used refrigerant to the atmosphere. To comply with these standards industry has designed and currently markets a multitude of recovery and recycling systems for R-12.

As used herein the term "recycled refrigerant" shall mean used refrigerant that has been cleaned of oil, moisture, solids and non-condensible gases to the extent necessary to meet the current UL published safety standards set forth in UL 1963 entitled "Standard for Safety Refrigerant Recovery/Recycling Equipment" and the current SAE published standards set forth in J1989 entitled "Service Procedure for Containment of R-12", J1990 entitled "Extraction and Recycle Equipment for Mobile Automotive Air Conditioning Systems" and J1991 entitled "Reclamation of R-12 Used in Mobile Air Conditioning Systems for Cleanliness".

The following are illustrative of commercial systems which process used refrigerant to produce recycled refrigerant: Wynn's Climate Systems, Inc.'s Refrigerant Recovery/Recycle System Model 9001A; SPX Robinair Division's Refrigerant Recovery and Recycling Station Models 17200, 17400, and 17500; Van Steenburgh Engineering Laboratories, Inc.'s Refrigerant Reclaim System Models Series LV and Series JV; K-Whit Tools, Inc's White Industries Division Refrigerant Recovery Recycling Center Models 01050 and 04000; Standard Motor Products, Inc.'s Four Seasons Division Refrigerant Recovery and Recycling Center Model 59870; and Refrigerant Technologies, Inc. Model RRC 1000.

In addition to the commercial products the following U.S. patents are also illustrative of the state of the art in refrigerant recovery and recycling of R-12 and other similar refrigerants: 3212284; 3232070; 4261178; 4285206; 4363222; 4476688; 4539817; 4646527; 4768347; 4805416; 4809520; 4878356; and 4903499.

Although these prior art devices can recover and recycle R-12 and other similar refrigerants, and some recover, recycle and recharge R-12, their design does not allow for the control desired when in use under actual commercial conditions. Many of these devices do not allow for easy and accurate determination that sufficient amounts of non-condensible material present in the used refrigerant have been removed. Others do not allow for the purging of air vapor that may be in the recycled refrigerant prior to being recharged to the automobile, truck or other vehicle air conditioning system. Still others are too temperature sensitive in the transferability of the refrigerant within the device. Others have no control of the level of refrigerant in the collection tank. Further problems with many of the prior art devices is control of the different procedures that can take place during the recover Another problem is the ability to accurately recharge the correct amount of recycled refrigerant back to the air conditioning system.

OBJECTS AND SUMMARY OF THE INVENTION

Therefore, it is an object of this invention to provide an assembly which has process flexibility during the refrigerant recovery and recycling operation, or refrigerant recovery, recycling and recharging operations.

Another object of this invention is to provide means for easy and accurate determination of the amounts of non-condensible gases present in the recycled refrigerant.

Still another object of this invention is to provide for the means to purge air vapor from recycled refrigerant with a minimum loss of refrigerant vapor.

A further object of this invention is to provide means to allow transferability of recycled refrigerant from a main storage tank to a recharging tank even when the pressure in the recharging tank is greater than in the main storage tank.

A still further object of this invention is to provide means to accurately determine and control the level of the recycled refrigerant in the main storage tank, as well as determine the amount of refrigerant recovered from each system. 1 Another object of this invention is to provide means to accurately recharge the correct amount of recycled refrigerant to an air conditioning system.

Other objects and advantages of this invention will become apparent from the ensuing descriptions of the invention.

Accordingly, an assembly to recover and recycle refrigerant from an air conditioning system is provided comprising (a) a first cleaning assembly having (i) an oil separator operatively connectable to the air conditioning system to receive contaminated refrigerant from the air conditioning system and structured to remove oils from the contaminated refrigerant, and (ii) a filter means operatively connected to the oil separator to receive the treated refrigerant from the oil separator and structured to remove solid particles and moisture from said treated refrigerant to form the cleaned refrigerant gas stream; (b) a compressor, having a compression chamber with a low pressure inlet and a high pressure outlet, operatively connected at said low pressure inlet to the filter means to cause the used refrigerant to pass through the filter means, and then to cause the cleaned refrigerant gas stream to pass through the low pressure inlet into the compression chamber, and structured to compress the cleaned refrigerant gas stream to form a cleaned refrigerant high pressure gas stream and to force the cleaned refrigerant high pressure gas stream out of said compression chamber through the high pressure outlet; (c) a condenser operatively connected to the compressor to receive the cleaned refrigerant high pressure gas stream and having cooling means to condense the cleaned refrigerant high pressure gas stream to form a liquid cleaned refrigerant containing stream; and (d) means operatively connected to the condenser to receive the liquid cleaned refrigerant containing stream in a manner to remove gas contaminates from the liquid cleaned refrigerant containing stream to form liquid recycled refrigerant.

In an alternate embodiment the storage means comprises both a tank forming a cavity and an attached tank cooling means for cooling the cavity.

In another alternate embodiment the assembly includes a metering means structured for receiving recycled refrigerant from the storage means and for discharging it at a pre-determined density to an air conditioning system in a pre-determined amount.

In a further alternate embodiment the assembly includes a gauge assembly attached to the storage means and having (i) one gauge to measure and visually display the amount of the actual pressure in the storage means cavity and (ii) a bulb-capillary temperature gauge whose capillary system is filled with the same type of refrigerant being recycled to measure the actual temperature in said cavity and having a recording means converted to visually display a pressure reading associated with the actual temperature measured by the bulb-capillary temperature gauge.

PREFERRED EMBODIMENTS OF THE INVENTION

Figure 1:
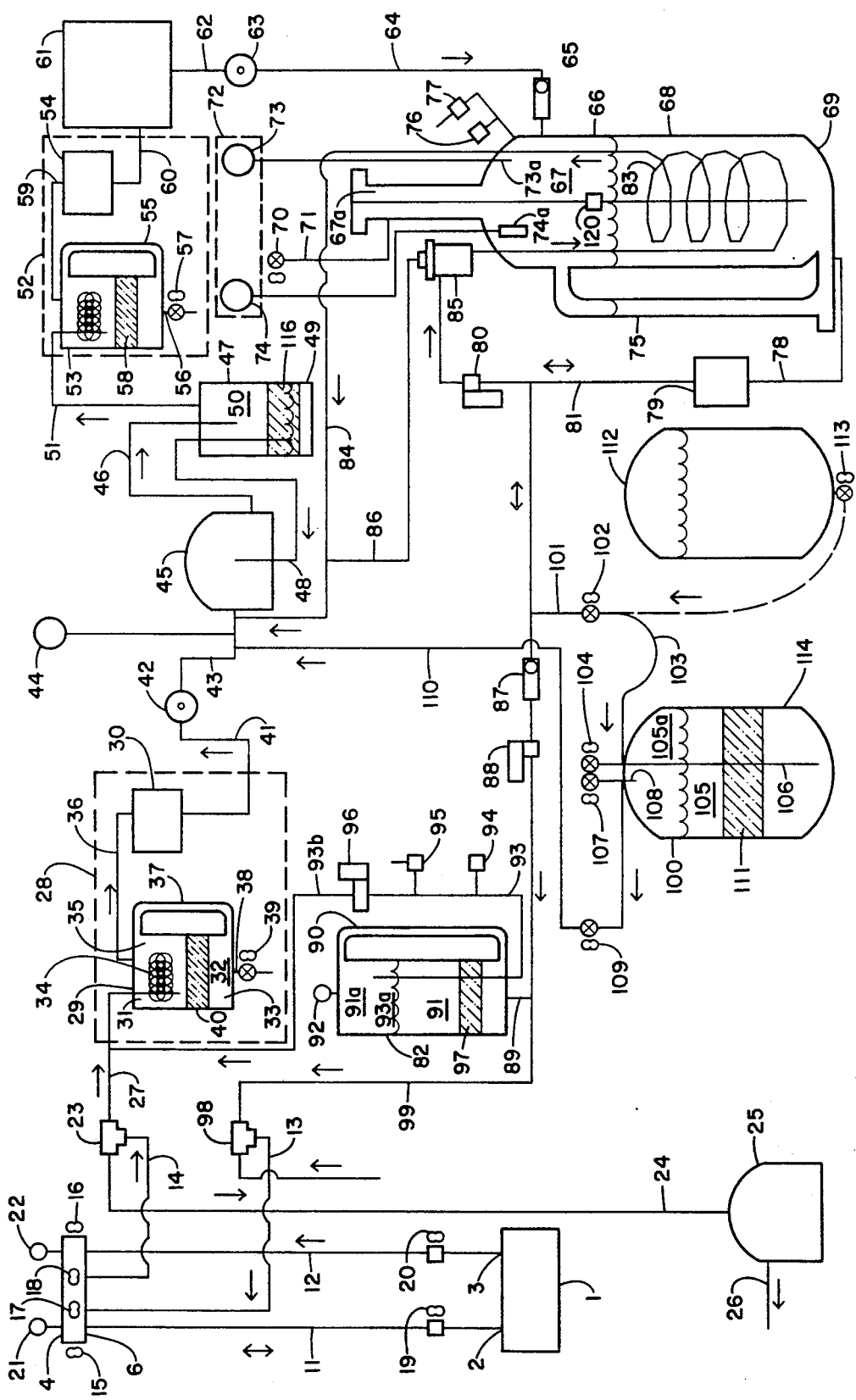
FIG. 1 is a schematic representation of preferred embodiments of the invention illustrating the hydraulics of the system.
Figure 3:
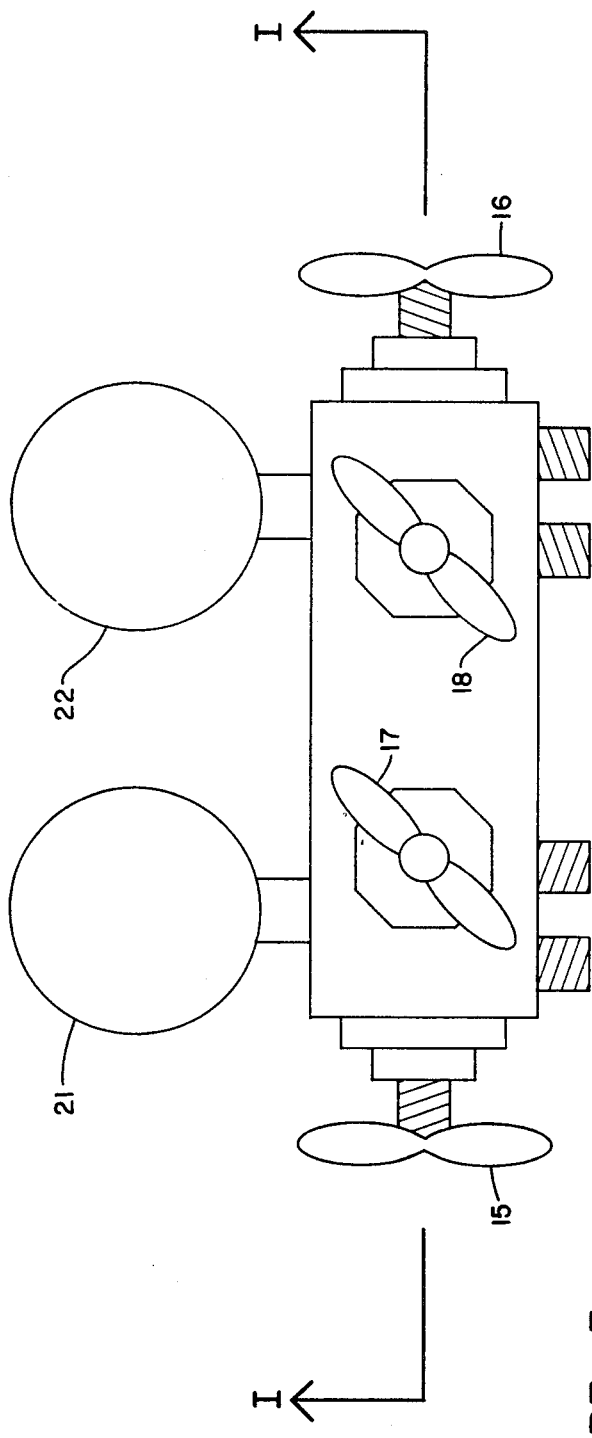
FIG. 3 is a frontal view of a preferred four valve manifold and gauge assembly employed in the invention.
Figure 4:
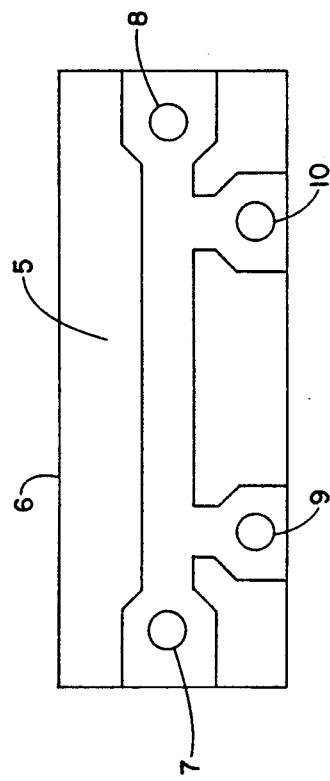
FIG. 4 is a cross-sectional view taken along lines I—I of FIG. 3 illustrating the cavity and connecting passageways of the four valve manifold assembly used with this invention.

Turning now to FIG. 1 an air conditioning system 1 having a low pressure port 2 and a high pressure port 3 is depicted by the dashed lines. Attachable by conventional means to air conditioning system 1 is a conventional four valve manifold assembly 4 (see FIGS. 3 and 4) to allow used refrigerant to be removed through port 2 and/or port 3 to a cavity 5 in manifold body 6 or to charge new or recycled refrigerant from cavity 5 to air conditioning system 1 through port 3. In addition to this refrigerant flow configuration it is preferred that manifold assembly 4 be structured to allow, if desired, refrigerant flow from cavity 5 to port 2 or refrigerant flow from port 3 to cavity 5. An example of a four valve manifold assembly 4 that can be used is Imperial Eastman Model No. 621C.

More particularly, manifold assembly 4 is structured so that manifold body 6 has four sealable passageways 7-10, each connecting cavity 5 to one of four refrigerant flow lines 11-14. In a preferred embodiment operatively attached to each flow line will be conventional valves 15-18, respectively.

In a more preferred embodiment refrigerant flow lines 11 and 12 are each provided with a second conventional valve 19 and 20, respectively, positioned near that end of refrigerant flow lines 11 and 12 that operatively connect to ports 2 and 3, respectively.

In a still more preferred embodiment manifold assembly 4 conventional pressure gauges 21 and 22 are operatively connected to measure and read any pressure which may exist in flow lines 11 and 12, respectively. Used refrigerant will flow from passageway 10 through line 14 to three-way valve 23 and through line 27 to a first cleaning assembly as which comprises an oil separator 29 and a filter dryer 30.

The oil separator 29 comprises a hollow container 31 having a cavity 32. Line 27 extends to the lower area 33 of cavity 32 and into which area the used refrigerant enters. Steel wool 34 or equivalent matter is positioned in the upper area 35 of cavity 32 to prevent any oil that may be in the used refrigerant from escaping cavity 32. The gaseous used refrigerant exits cavity 32 through line 36. In a preferred embodiment a sight glass 37 will be operatively connected to container 31 to allow visual observation of the amount of oil that is trapped in oil separator 29. When the amount of oil reaches a pre-determined level it may be drained from cavity 32 through line 38 by opening drain valve 39. In another preferred embodiment a heating band 40 may be wrapped about lower cavity area 33 to aid in the separation of the oil from the gaseous refrigerant by raising the temperature in oil separator 29 to boil off the refrigerant vapor.

The oil scrubbed refrigerant passes through line to a conventional filter dryer 30 wherein solid particles and moisture (includes both water and acid) that may be contained in the refrigerant is removed. The dried, oil scrubbed refrigerant exits filter dryer 30 through line 41 to which a moisture indicator 42 is operatively attached to determine if filter dryer 30 is saturated with moisture and needs to be replaced. The refrigerant continues past moisture indicator 42 through line 43 to which a compressor suction pressure gauge 44 is operatively attached to visually indicate the refrigerant pressure before it enters the suction side of compressor 45. In compressor 45 the refrigerant is compressed before it exits through line 46 and is passed through a compressor protective oil separator 47 to remove most of the oil which the refrigerant may have picked up in compressor 45. In a preferred embodiment a return line 48 will allow in a conventional fashion any oil collected at the bottom area 49 of cavity 50 of the oil separator 47 to be returned to compressor 45 for reuse. In another preferred embodiment heater band 116 is positioned about bottom area 49 to insure that the refrigerant is boiled out of the entrapped oil that collects in bottom area 49.

The gaseous refrigerant exits from the top of cavity through line 51 and passes through a second cleaning assembly 52 having an oil separator 53 and filter dryer 54 connected by line 59 like those in the first cleaning assembly 28 described above. As before it is preferred that oil separator 53 be provided with a sight glass 55 for visually determining if an upset condition exists since it is not desirable that any oil should ever accumulate in the bottom of the oil separator 53. Also it is preferred that oil separator 53 be provided with a drain line 56 which will allow any oil that has accumulated in the bottom of the oil separator 53 to be drained out by opening drain valve 57. It is further preferred that a heating band 58 be positioned about the lower section of oil separator 53 as described above.

The refrigerant exits filter dryer 54 through line 60 and passes through a conventional condenser 61 wherein it exits condenser 61 as a liquid through line 62. It is preferred that a moisture indicator 63 be operatively connected to line 62 to determine if there is any moisture contained in the liquid refrigerant. If there is this would be an indication of an upset condition, such as failure to timely replace filter dryer 30 and the subsequent saturation of filter dryer 54. Timely replacement of filter dryer 30 should obviate the need to ever replace filter dryer 54. The liquid refrigerant continues past moisture indicator through line 64 and check valve 65 wherein it preferably enters into the upper area 66 of cavity 67 of sealable tank 68. Check valve 65 prevents refrigerant in cavity 67 from flowing back out and into line 64. The liquid refrigerant which has now been purified, except of non-condensibles such as air, is collected at the lower area 69 of refrigerant collection tank cavity 67. A portion of the air, or other non-condensibles, which may be in the refrigerant will collect in a less turbulent zone 67a of cavity 67 located in upper area 66 until an equilibrium is reached in cavity 67. At this point purge valve 70 is opened and the air in zone 67a escapes through line 71 to the atmosphere. The purge valve 70 is then closed. As equilibrium is again achieved in cavity 67, any additional air that may be entrapped with the vapor and/or liquid refrigerant will rise to zone 67a wherein it can then be purged as before. This procedure can be repeated as often as necessary to remove the desired amount of non-condensibles to meet the UL and SAE standards. Present UL safety standards and SAE standards require that sufficient non-condensibles be removed so that the vapor pressure of all recycled refrigerant not be greater than 10 psig above the vapor pressure of certified pure refrigerant. To assist in monitoring the amount of air or other non-condensibles remaining in the refrigerant in tank 68 is a gauge assembly 72 comprising a tank pressure gauge 73 and tank bulb-capillary gauge 74 which preferably are positioned so that their sensing means 73a and 74a take readings from the same level in cavity 67. In a preferred embodiment sight glass 75 is operatively connected to tank 68 to assist in monitoring the amount of liquid refrigerant in tank 69. In a preferred embodiment tank 68 is provided with a conventional pressure limiting device 76 to shut down operation of the compressor 45 when the pressure in tank 68 exceeds a pre-determined level, and a pressure relief valve 77 to prevent the pressure within tank 68 from exceeding a predetermined pressure that is higher than the pre-determined pressure for the pressure limiting device 76. More particularly tank 68 is provided with float switch 120 positioned in cavity 67 that is electrically connected to relay 122 to shut down operation of the compressor 45 when a pre-determined liquid level has been reached. A by-pass switch 128 and red lamp switch are electrically connected to relay 122 to first warn the operator the predetermined liquid level has been reached and second to permit by activating red lamp switch 123, if needed, the momentary override of the shutdown of compressor 45 to allow the transfer of liquid refrigerant into or out of tank 68 depending on whether float switch 120 was activated by a low level or a high level condition.

The novel gauge assembly 72 of this invention allows the quick and accurate determination of the presence of non-condensibles in cavity 67 by showing an elevated vapor pressure greater than certified pure refrigerant would show. Tank pressure gauge 73 measures the actual pressure within tank 68. The bulb-capillary gauge 74 is of a conventional temperature capillary gauge construction, but whose capillary tube has been filled with certified pure refrigerant of the same kind of refrigerant that is being recycled. In addition the visual recorder of gauge 74 has been modified to directly read the corresponding pressure of the tank as if it contained certified pure refrigerant. Thus, to meet the UL and SAE standards the difference in the reading from the two gauges should be less than 10 psig when tank 68 has been purged sufficiently to remove most of the non-condensibles.

This gauge assembly 72 will work with any refrigerant including R-12, R-22, R-500, R-502, R-134a or ammonia. When a visual recorder is used to test for non-condensibles in R-12, the scales are preferably set to read from 0-300 psig in order to provide better visibility. This range will vary depending on the particular refrigerant used. In another embodiment the readings from each of the gauges 73 and 74 could be electronically inputted into a calculating device, such as a computer, and the difference in readings visually displayed. In this embodiment the operator would not need to subtract the reading of one gauge from that of the other to obtain the difference. If this calculation is not electronically done, then it is preferred that each of the visual recorders of the gauges 73 and 74 be positioned adjacent one another on the control panel of the refrigerant purification unit to facilitate a quick and accurate reading of the gauges.

Recycled refrigerant is drawn from the lower area 69 of tank 68 through line 78 and into a two-way filter dryer 79 to insure that no solid particles or moisture will be permitted to flow through line 81. If the recycled refrigerant is to be returned to the air conditioning system 1 it will pass through line 81 to charging cylinder 82 as described below. However, it may be desirable to run part of the recycled refrigerant in tank 68 back into cavity 67 through evaporator coils 83 and then to compressor 45 through line 84. In this manner the refrigerant can be used on hot days to cool tank 68 before used refrigerant is removed from air conditioning system 1 in order to enable compressor 45 to draw down the air conditioning system 1 to zero psig as well as to prevent compressor overload or burn out. In addition if a portion of the refrigerant is run through evaporator coils 83 this will enhance non-condensible gas separation from both the liquid and vapor phase of the refrigerant that is in tank 68. In using the recycled refrigerant for these two purposes, it passes through solenoid valve 80 and then to an expansion valve 85 before passing through evaporator coils 83. It is preferred that an external equalizer line 86 (shown by dotted lines) connect line 84 near the suction side of compressor 45 and expansion valve 85 to insure that the proper pressure differentials exist to allow the proper operation of the expansion valve over the complete range of ambient temperatures encountered in operation.

Recycled refrigerant in line 81 passes through check valve 87 and solenoid valve 88 into charging cylinder 82 via line 89. Charging cylinder 82 is provided with a sight glass 90 to enable one to determine the liquid level of refrigerant in cavity 91 of cylinder 82. A pressure gauge 92 is operatively attached to cylinder 82 to measure the pressure within cavity 91. In the event pressure within cavity 91 exceeds a pre-determined level, the pressure may be reduced by allowing gaseous refrigerant to be bled from cavity 91 through pressure relief valve 95 via line 93. Line 93 has one end 93a opening above the liquid level of the refrigerant in the upper area 91a of cavity 91 and being operatively connected to pressure relief valve 95. In addition pressure limiting device 94 is operatively connected to line 93 to electrically shut off heater 97 when a lower pre-determined pressure is exceeded Line 93 has section 93b that connects opening 93a to line 27 at a position before the first cleaning assembly 28. Flow through line 93 is controlled by solenoid valve 96.

For safety purposes charging cylinder 82 should not be filled with liquid to more than 80% of its liquid volume capacity. In the event of such an occurrence, line 93 can be utilized to draw by compressor 45 such excess liquid refrigerant from the upper area 91a of cavity 91 and discharge it into line 27.

In a more preferred embodiment heater band 97 will wrap about cylinder 82 to maintain the pressure within cavity 91 at the desired level to allow accurate charging of the refrigerant into air conditioning system 1 over a wide range of ambient temperatures. For vehicle air conditioning systems using R-12 refrigerant the desired pressure will be reached if the temperature in cylinder 82 is above the highest practical ambient temperature of the vehicle being repaired, preferably about 112° F.

Prior to recharging, any air or moisture that may be in air conditioning system 1 is recovered by activating vacuum pump 25 which pulls the moisture and air from port 2 and/or port 3, through lines 11 and/or 12, through passageway 10, through line 14 to three-way valve 23 which has been set to allow the air and moisture to be sucked through line 24, through vacuum pump 25, and out line 26 to the atmosphere.

When the proper amount of liquid recycled refrigerant is in charging cylinder 82 and the pressure within cavity 91 is at the desired level, then three way valve 98 is opened to allow flow from line 89, through line 99 and three-way valve 98 into line 13. The valves 17, 16 of manifold assembly 4 have been opened, along with shutoff valve 20 to allow the recycled refrigerant to enter port 3 of air conditioning system 1.

A further benefit of the preferred connection between manifold 4 and three-way valves 23 and 98 is that by providing for use of line 14 for the used refrigerant recovery operation and for use of separate line 12 for charging recycled refrigerant, contamination of recycled refrigerant by used refrigerant is prevented.

In alternate embodiments of this invention recycled refrigerant from tank 68 may be sent to a refillable auxiliary tank 100. Unless activated solenoid valves 80 and 88 will cause the recycled refrigerant to flow from tank 68 through line 81 to tank 100. More particularly recycled refrigerant will pass through line 78 and two-way filter dryer 79 into line 81 and then into line 101 and through shut off valve 102 which has been opened, and finally via line 103 through tank valve 104 into the bottom area of cavity 105 via line 106. Tank 100 is provided with a second tank valve 107 which allows gaseous refrigerant from the upper area 105a of cavity 105 to exit via line 108, through shut off valve 109 and line 110 to enter line 43 leading to the suction side of compressor 45. In a preferred embodiment heater band will be operatively attached to tank 100 to heat the refrigerant inside cavity 105 to achieve the desired pressure within cavity 105 to facilitate the transfer of refrigerant out of tank 100.

It could be possible to design the system so that refrigerant in tank 100 can be used to charge cylinder 82. However, it is preferred because of the similar sizing of tanks 100 and 68 and because of possible off-spec refrigerant in tank 100 that the refrigerant in tank 100 be used to first charge tank 68 and then use tank 68 to charge cylinder 82. In this manner two-way filter dryer 79 will remove moisture and solids from the refrigerant in tank 100 before it enters tank 68, and then again when refrigerant is transferred from tank 68 to charging cylinder 82.

In another alternate embodiment a non-refillable auxiliary tank 112 can be provided to provide new refrigerant to the system in the event there is insufficient recycled refrigerant in tank 68, auxiliary tank 100 or charging cylinder 82 to provide the proper amount of refrigerant charge to the air conditioning system 1. In this situation liquid refrigerant from inverted tank 112 passes through tank valve 113 via line 103 to allow the refrigerant to flow therein. In another preferred embodiment heater band 111 is positioned about tank 112 to insure that liquid refrigerant will flow from tank 112 to tank 68.

One particular advantage that the recycling system of this invention has over all prior art systems is its flexibility to meet any recharging or recycling situation. For example, when the recharging cylinder has become hot causing the pressure in cylinder cavity 91 to become greater than that in tank cavity 67, it would normally not be possible to move recycled refrigerant from tank cavity 67 to cylinder cavity 91. However, with the preferred embodiments of this invention the pressure in cylinder cavity 91 can be lowered sufficiently by switching on compressor 45 and opening solenoid 96 thereby allowing recycled refrigerant to flow through line 89 since solenoid valve 88 has also been opened.

Although heater bands 40, 58, 97, 111 and 116 have been described as being external of the various oil separators, tanks and cylinders, any conventional heating means can be employed.

Figure 2:
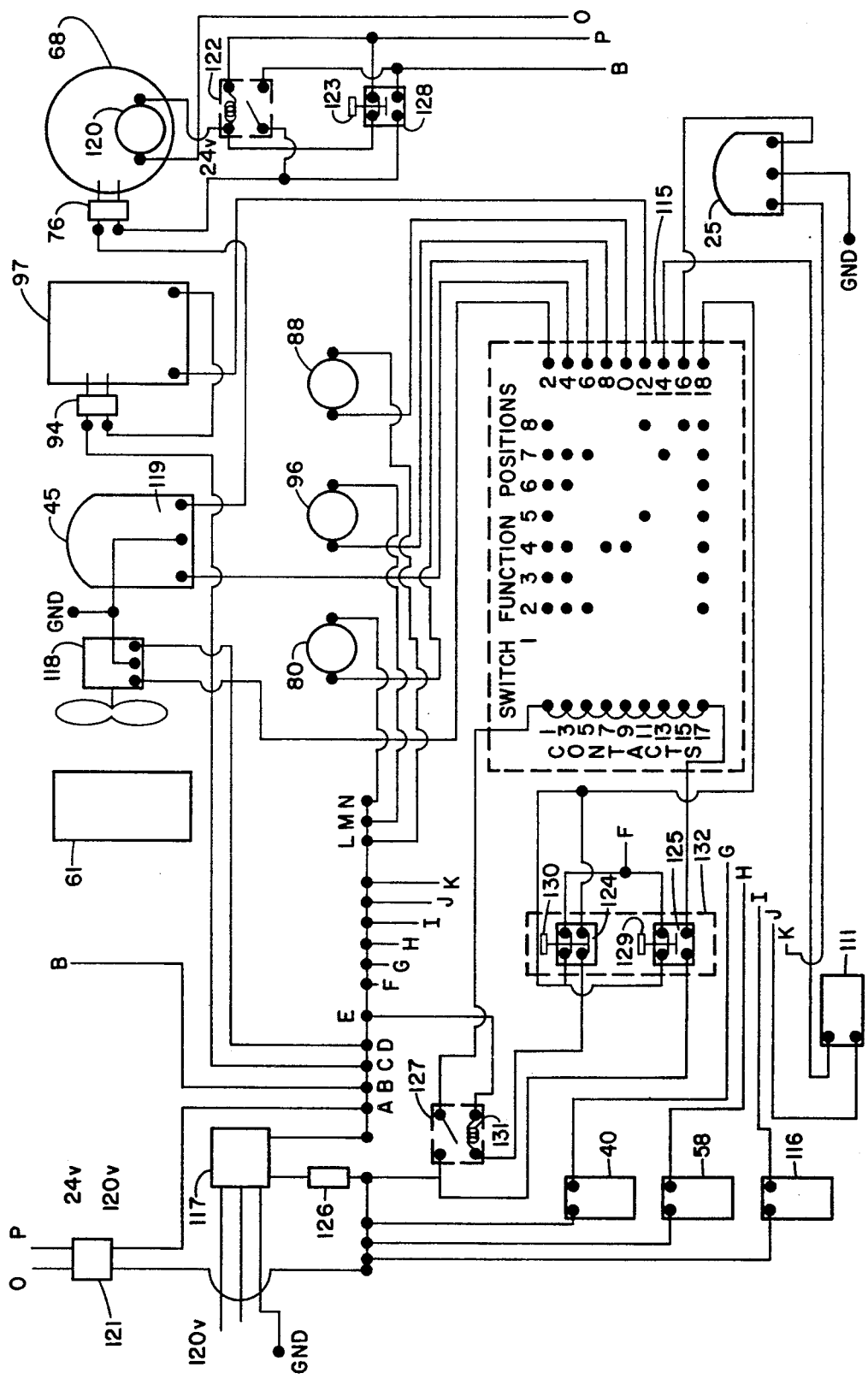
FIG. 2 is a schematic representation of preferred embodiments of the invention illustrating the electrical connections utilized in the system illustrated in FIG. 1.

In another preferred embodiment a dual illuminated push button switch assembly 132 is provided having two illuminated push button switches 124 and 125 electrically connected to circuit breaker 126, coil 131 and rotary cam switch 115 in a manner so that at rotary cam switch settings 2-8 pushing illuminated (preferably green light) operator 129 energizes coil 131 to provide electrical power to rotary cam switch 115 and illuminated operators 129 and 130. In the preferred electrical circuit shown in FIG. 2 electrical power to rotary cam switch 115 can in an emergency be cut off by pressing illuminated (preferably red light) operator 130. This will result in the immediate termination of whatever operation is then occuring.

In another preferred aspect of this invention all major functions of the assembly can be electrically controlled from a 13 single rotary cam switch, such as a Square D Type K rotary cam switch. This is accomplished by the electrical circuit schematic shown in FIG. 2. In this preferred embodiment rotary cam switch 115 is provided with eight switch settings which correspond to the following functions: setting 1—off function; setting 2—recycle function; setting 3—recovery function; setting 4—refrigerant transfer from tank 68 to charging cylinder 82 function; setting 5—refrigerant transfer from charging cylinder 82 to air conditioning system 1;

setting 6—refrigerant transfer from tank 68 to auxiliary tank 100; setting 7—refrigerant transfer from auxiliary tank 100 or tank 112 to tank 68; and setting 8—activate vacuum pump 25 function.

A typical power receptacle 117, such as a 120 volt power receptacle, is provided having its plus side connected to circuit breaker 126. In turn the plus side of circuit breaker 126 is connected to the plus side of transformer 121, oil separator band heaters 40, 58 and 116, relay switch 127 (which is normally open unless activated by coil 131), and to relay reset switch 125 (which is normally open).

When circuit breaker 126 is turned on and rotary switch 115 has been set to setting 1 no electrical circuit is completed to provide electrical power to any of the electrical devices in the electrical circuit except those independent of switch 115; e.g. heater bands 40, 58 and 116, as well as float switch 120, transformer 121, relay 122, and lamp switch 123.

At setting 2, electrical power is provided to condenser fan motor 118 by closing contacts 1-2 of switch 115, to compressor motor 119 by closing contacts 3-4, to solenoid so by closing contacts 5-6, and switch assembly 132 by closing contacts 17-18.

At setting 3, electrical power is provided to condenser fan motor 118 by closing contacts 1-2, to compressor motor 119 by closing contacts 3-4 and to switch assembly 132 by closing contacts 17-18.

At setting 4, electrical power is provided to condenser fan motor 118 by closing contacts 1-2, to compressor motor 119 by closing contacts 3-4, to solenoid 96 by closing contacts 7-8, to solenoid 88 by closing contacts 9-10 and switch assembly 132 by closing contacts 17-18.

At setting 5, electrical power is provided to condenser fan motor 118 by closing contacts 1-2, to charging cylinder band heater 97 by closing contacts 11-12 and switch assembly 132 by closing contacts 17-18.

At setting 6, electrical power is provided to condenser fan motor 118 by closing contacts 1-2, to compressor motor 119 by closing contacts 3-4 and switch assembly 132 by closing contacts 17-18.

At setting 7, electrical power is provided to condenser fan motor 18 by closing contacts 1-2, to compressor motor 119 by closing contacts 3-4, to solenoid 80 by closing contacts 5-6, to auxiliary tank band heater 111 by closing contacts 13-14 and switch assembly 132 by closing contacts 17-18.

At setting 8, electrical power is provided to condenser fan motor 118 by closing contacts 1-2, to charging cylinder band heater 97 by closing contacts 11-12, to vacuum pump 25 by closing contacts 15-16 and switch assembly 132 by closing contacts 17-18.

When changing from one setting to another, it is preferred that power is disrupted to switch 115, and lighted (preferably green) switch 125 must be turned on again.

There are of course other alternate embodiments which are obvious from the foregoing descriptions of the invention which are intended to be included within the scope of the invention as defined by the following claims.

What I claim is:

1. An assembly for recovering and recycling used refrigerant from an air conditioning system which comprises:

(a) a first cleaning assembly comprising:

(i) an oil separator operatively connectable to said air conditioning system to receive contaminated refrigerant from said air conditioning system and structured to remove oils from said contaminated refrigerant, and (ii) a filter means operatively connected to said oil separator to receive the treated refrigerant from said oil separator and said structured to remove solid particles and moisture from said treated refrigerant to form a cleaned refrigerant gas stream;

(iii) a valve assembly having a sealable first connection means attachable to said air conditioning system to receive said used refrigerant, and a sealable second connection means attachable to said oil separator to allow said used refrigerant to operatively pas to said oil separator, and a sealable third connection means operatively attachable to a vacuum pump to permit evacuation of said air conditioning system;

(b) a compressor, having a compression chamber with a low pressure inlet and a high pressure outlet, operatively connected at said low pressure inlet to said filter mean to cause said cleaned refrigerant to pas through said filter means, and then to cause said cleaned refrigerant gas stream to pass through said low pressure inlet into said compression chamber, and structured to compress said cleaned refrigerant gas stream to for ma cleaned refrigerant high pressure gas stream to force said cleaned refrigerant high pressure gas stream out of said compression chamber through said high pressure outlet;

(c) a condenser operatively connected to said compressor to receive said cleaned refrigerant high pressure gas stream and having cooling means to condense said cleaned refrigerant high pressure gas steam to form a liquid cleaned refrigerant containing stream;

(d) means operatively connected to said condenser to receive said liquid cleaned refrigerant containing stream in a manner to remove non-condensible gas contaminates from said liquid cleaned refrigerant containing stream to form liquid recycled refrigerant; and (e) a metering means comprising a charging cylinder forming a cavity provided with an inlet opening for receiving liquid recycled refrigerant from a storage means, and an outlet opening for discharging said liquid recycled refrigerant from the charging cylinder cavity, said metering means being operatively connected to discharge, through a second solenoid valve to said first cleaning assembly, gas refrigerant contained a vapor space located in the charging cylinder cavity whenever said liquid recycled refrigerant is received from said storage means through a third solenoid valve operatively connected to a sealable outlet opening of said storage means.

2. An assembly for recovering and recycling used refrigerant from an air conditioning system which comprises:

(a) a first cleaning assembly comprising:

(i) an oil separator operatively connectable to said air conditioning system to receive contaminated refrigerant from said air conditioning system and structured to remove oils from said contaminated refrigerant, and (ii) a filter means operatively connected to said oil separator to receive the treated refrigerant from said oil separator and said structured to remove solid particles and moisture from said treated refrigerant to form a cleaned refrigerant gas stream;

(iii) a valve assembly having a sealable first connection means attachable to said air conditioning system to receive said used refrigerant, and a sealable second connection means attachable to said oil separator to allow said used refrigerant to operatively pass to said oil separator, and a sealable third connection means operatively attachable to a vacuum pump to permit evacuation of said air conditioning system;

(b) a compressor, having a compression chamber with a low pressure inlet and a high pressure outlet, operatively connected at said low pressure inlet to said filter means to cause said cleaned refrigerant to pass through said filter means, and then to cause said cleaned refrigerant gas stream to pass through said low pressure inlet into said compression chamber, and structured to compress said cleaned refrigerant gas stream to form a cleaned refrigerant high pressure gas stream and to force said cleaned refrigerant high pressure gas stream out of said compression chamber through said high pressure outlet;

(c) a condenser operatively connected to said compressor to receive said cleaned refrigerant high pressure gas stream and having cooling means to condense said cleaned refrigerant high pressure gas stream to form a liquid cleaned refrigerant containing stream;

(d) means operatively connected to said condenser to receive said liquid cleaned refrigerant containing stream in a manner to remove non-condensible gas contaminates from said liquid cleaned refrigerant containing stream to form liquid recycled refrigerant; and (e) a metering means operatively connected to a storage means to receive from said cavity through a sealable outlet opening of said storage means at least some of said liquid recycled refrigerant, and to discharge at a pre-determined density to said air conditioning system a pre-determined amount of the received liquid recycled refrigerant.

3. An assembly according to claim 2 wherein said metering means comprises a charging cylinder forming a cavity provided with an inlet opening for receiving liquid recycled refrigerant from said storage means, and an outlet opening for discharging said liquid recycled refrigerant from the charging cylinder cavity, and wherein a means to prevent said cavity from being filled with said liquid recycled refrigerant above a predetermined amount is operatively attached to said charging cylinder.

4. An assembly according to claim 3 wherein a heating means is operatively connected to said charging cylinder to heat said liquid recycled refrigerant in the charging cylinder cavity to a pre-determined temperature.

5. An assembly according to claim 4 wherein said heating means has sufficient heating capacity to heat said liquid recycled refrigerant in the charging cylinder cavity to at lest 112° F. and is provided with a pressure limiting device to prevent said heating means from heating said liquid recycled refrigerant above about 112° F.

6. An assembly for recovering and recycling used refrigerant from an air conditioning system which comprises:

(a) a first cleaning assembly comprising means to receive and then to remove liquid and solid contaminates from said used refrigerant to form a cleaned refrigerant gas stream;

(b) a compressor, having a compression chamber with a low pressure inlet and a high pressure outlet, operatively connected at said low pressure inlet to said means to cause said cleaned refrigerant to pass through said means, and then to cause said cleaned refrigerant gas stream to pass through said low pressure inlet into said compression chamber, and structured to compress said cleaned refrigerant gas stream to form a cleaned refrigerant high pressure gas stream and to force said cleaned refrigerant high pressure gas stream out of said compression chamber through said high pressure outlet;

(c) a condenser operatively connected to said compressor to receive said cleaned refrigerant high pressure gas stream and having cooling means to condense said cleaned refrigerant high pressure gas stream to form a liquid cleaned refrigerant containing stream;

(d) a storage means comprising:

(i) a tank forming a cavity having a gas contaminate area located in the upper section of said cavity and having a liquid recycled refrigerant area located in the lower section of said cavity, said storage means having an inlet opening operatively connected to said condenser and positioned to receive said liquid cleaned refrigerant containing stream into said cavity so as to allow any liquid cleaned refrigerant in said liquid cleaned refrigerant containing stream to locate in said liquid recycled refrigerant area and to allow any gas contaminates in said liquid cleaned refrigerant containing stream to locate in said gas contaminate area, said storage means having a sealable outlet opening positioned to allow discharge of any liquid recycled refrigerant in said liquid recycled refrigerant area, and (ii) tank cooling means operatively attached to said tank to cool said cavity, comprising:

(A) a first solenoid valve operatively attached to said tank to allow said liquid recycled refrigerant from said sealable outlet opening to pass, (B) an adjustable constant pressure externally equalized expansion valve having a high pressure opening operatively attached to said first solenoid valve and having a low pressure opening, and (C) a length of tubing, a section of which is positioned in said cavity, one end of said tubing being operatively attached to said low pressure opening and the opposite end of said tubing being operatively connected to said low pressure inlet of said compression chamber, and (e) a purge means operatively connected to said storage means to purge said gas contaminate area of sufficient amounts of said gas contaminates which may have collected in said cavity to achieve less than a pre-determined maximum amount of said gas contaminates in said recycled liquid refrigerant.

7. An assembly for recovering and recycling used refrigerant from an air conditioning system and recharging the recycled refrigerant to the same or another air conditioning system which
  (a) a first cleaning assembly comprising means to receive and then to remove liquid and solid contaminates from said used refrigerant to form a cleaned refrigerant gas stream;
  (b) a compressor, having a compression chamber with a low pressure inlet and a high pressure outlet, operatively connected at said low pressure inlet to said means to cause said cleaned refrigerant to pass through said means, and then to cause said cleaned refrigerant gas stream to pass through said low pressure inlet into said compression chamber, and structured to compress said cleaned refrigerant gas stream to form a cleaned refrigerant high pressure gas stream and to force said cleaned refrigerant high pressure gas stream out of said compression chamber through said high pressure outlet;
  (c) a condenser operatively connected to said compressor to receive said cleaned refrigerant high pressure gas stream and having cooling means to condense said cleaned refrigerant high pressure gas stream to form a liquid cleaned refrigerant containing stream;
  (d) a storage means forming a cavity having a gas contaminate area located in the upper section of said cavity and having a liquid recycled refrigerant area located in the lower section of said cavity, said storage means having an inlet opening operatively connected to said condenser and positioned to receive said liquid cleaned refrigerant containing stream into said cavity so as to allow any liquid cleaned refrigerant in said liquid cleaned refrigerant containing stream to locate in said liquid recycled refrigerant area and to allow any gas contaminates in said liquid cleaned refrigerant containing stream to locate in said gas contaminate area, said storage means having a sealable outlet opening positioned to allow discharge of any liquid refrigerant in said liquid recycled refrigerant area,
  (e) a purge means operatively connected to said storage means to purge at pre-determined times said gas contaminate area of at least some of said gas contaminates which may have collected in said cavity, and
  (f) a metering means operatively connected to said storage means to receive from said cavity through said sealable outlet opening at least some of said liquid recycled refrigerant, and to discharge at a pre-determined density to said air conditioning system a pre-determined amount of the received liquid recycled refrigerant.

8. An assembly according to claim 7 wherein said metering means comprises a charging cylinder forming a cavity provided with an opening for receiving liquid recycled refrigerant from said storage means or for discharging said liquid recycled refrigerant from the charging cylinder cavity, and further provided with a means attached to said charging cylinder to prevent said cavity from being filled with said liquid recycled refrigerant above a pre-determined amount.

9. An assembly according to claim 8 wherein said metering means is operatively connected to said compressor to discharge, through a second solenoid valve to said first cleaning assembly, gas refrigerant contained in a vapor space located in the charging cylinder cavity whenever liquid recycled refrigerant is received from said storage means through a third solenoid valve operatively connected to said sealable outlet of said storage means.

10. An assembly according to claim 8 wherein said metering means is operatively connected to discharge liquid refrigerant from said charging cylinder cavity through a second solenoid valve to said first cleaning assembly.

11. An assembly according to claim 9 wherein a heating means is operatively connected to said charging cylinder to heat said liquid recycled refrigerant in the charging cylinder cavity to a pre-determined temperature.

12. An assembly according to claim 11 wherein said heating means has sufficient heating capacity to heat said liquid recycled refrigerant in the charging cylinder cavity to at least 112° F. and is provided with a pressure limiting device to prevent said heating means from heating said liquid recycled refrigerant above about 112° F.

13. An assembly according to claim 6 or 7 which further comprises a gauge assembly comprising:
  (a) a first gauge attached to said storage means and having a sensing means operatively positioned with respect to said cavity to sense the actual pressure in said cavity, and having a recording means operatively connected to said sensing means to visually display the amount of said actual pressure and
  (b) a bulb-capillary temperature gauge having a capillary sensing means containing a fluid being of the same composition as the refrigerant desired to be charged in said air conditioning system, and operatively connected to said storage means to directly sense the actual temperature in said cavity, and having a converted recording means operatively connected to said capillary sensing means to visually display the amount of a pre-determined pressure associated with said actual temperature.

14. An assembly according to claim 13 wherein said first gauge and said bulb-capillary temperature gauge are positioned at about the same level in said cavity to measure the pressure and temperature, respectively, of the gases in said cavity.

15. An assembly according to claim 13 wherein said recording means and said converted recording means are structured to display the same range of possible pressures, and wherein each are provided with a pointer means to indicate on the display of the range of possible pressures the amount of said actual pressure and the amount of a pre-determined pressure associated with said actual temperature, respectively.

16. An assembly according to claim 15 wherein said refrigerant is R-12 and wherein said range of possible pressures is about 0–300 psig.

17. An assembly for recovering and recycling used refrigerant from an air conditioning system which comprises:
  (a) a first cleaning assembly comprising means to receive and then to remove liquid and solid contaminates from said used refrigerant to form a cleaned refrigerant gas stream;
  (b) a compressor, having a compression chamber with a low pressure inlet and a high pressure outlet, operatively connected at said low pressure inlet to said means to cause said cleaned refrigerant to pass through said means, and then to cause said cleaned refrigerant gas stream to pass through said low pressure inlet into said compression chamber, and structured to compress said cleaned refrigerant gas stream to form a cleaned refrigerant high pressure gas stream and to force said cleaned refrigerant high pressure gas stream out of said compression chamber through said high pressure outlet;

(c) a condenser operatively connected to said compressor to receive said cleaned refrigerant high pressure gas stream and having cooling means to condense said cleaned refrigerant high pressure gas stream to form a liquid cleaned refrigerant containing stream;

(d) a storage means forming a cavity having a gas contaminate area located in the upper section of said cavity and having a liquid recycled refrigerant area located in the lower section of said cavity, said storage means having an inlet opening operatively connected to said condenser and positioned to receive said liquid cleaned refrigerant maintaining stream into said cavity so as to allow any liquid cleaned refrigerant in said liquid cleaned refrigerant containing stream to locate in said liquid recycled refrigerant area and to allow any gas contaminates in said liquid cleaned refrigerant containing stream to locate in said gas contaminate area, said storage means having a sealable outlet opening positioned to allow discharge of any liquid recycled refrigerant in said liquid recycled refrigerant area, (e) a gauge assembly for determining the amount of gas contaminates in said cavity, said gauge assembly comprising:
 (i) a first gauge attached to said storage means and having a sensing means operatively positioned with respect to said cavity to sense the actual pressure in said cavity, and having a recording means operatively connected to said sensing means to visually display the amount of said actual pressure and
 (ii) a bulb-capillary temperature gauge having a capillary sensing means containing a fluid being of the same composition as the refrigerant desired to be charged in said air conditioning system, and operatively connected to said storage means to directly sense the actual temperature in said cavity, and having a converted recording means operatively connected to said capillary sensing means to visually display the amount of a pre-determined pressure associated with said actual temperature, and (f) a purge means operatively connected to said storage means to purge at pre-determined times said gas contaminate area of at least some of said gas contaminates which may have collected in said cavity.

18. An assembly according to claim 17 wherein said first gauge and said bulb-capillary temperature gauge are positioned at about the same level in said cavity to measure the pressure and temperature, respectively, of the gases in said cavity.

19. An assembly according to claim 18 wherein said recording means and said converted recording means are structured to display the same range of possible pressures, and wherein each are provided with a pointer means to indicate on the display of the range of possible pressures the amount of said actual pressure and the amount of a pre-determined pressure associated with said actual temperature, respectively.

20. An assembly according to claim 19 wherein said refrigerant is R-12 and wherein said range of possible pressures is about 0–300 psig.

21. An assembly according to claim 6, 7 or 17 wherein said means to remove liquid and solid contaminates comprises:
 (i) an oil separator operatively connectable to said air conditioning system to receive contaminated refrigerant from said air conditioning system and structured to remove oils from said contaminated refrigerant,
 (ii) a filter operatively connected to said oil separator to receive treated refrigerant from said oil separator and structured to remove solid particles and moisture from said treated refrigerant to form said cleaned refrigerant gas stream, and
 (iii) a valve assembly having a sealable first connection means attachable to said air conditioning system to receive said used refrigerant, and a sealable second connection means attachable to said oil separator to allow said used refrigerant to operatively pass to said oil separator, and a sealable third connection means operatively attachable to a vacuum pump to permit evacuation of said air conditioning system.

22. An assembly according to claim 21 wherein said assembly further comprises a metering means having an inlet opening operatively connected to said storage means to receive from said cavity through said sealable outlet opening at least some of said liquid recycled refrigerant, and to discharge through a sealable outlet opening of the metering means at a pre-determined density to said air conditioning system through a second valve assembly a pre-determined amount of the received liquid recycled refrigerant.

23. An assembly according to claim 6 or 17 wherein said assembly further comprises a metering means comprising a charging cylinder forming a cavity provided with an inlet opening for receiving liquid recycled refrigerant from said storage means, and an outlet opening for discharging said liquid recycled refrigerant from the charging cylinder cavity, said metering means being operatively connected to discharge, through a second solenoid valve to said first cleaning assembly, gas refrigerant contained in a vapor space located in the charging cylinder cavity whenever said liquid recycled refrigerant is received from said storage means through a third solenoid valve operatively connected to said sealable outlet opening of said storage means.

24. An assembly according to claim 6 or 17 which further comprises a metering means operatively connected to said storage means to receive from said cavity through said sealable outlet opening at least some of said liquid recycled refrigerant, and to discharge at a pre-determined density to said air conditioning system a pre-determined amount of the received liquid recycled refrigerant.

25. An assembly according to claim 24 wherein said metering means comprising a charging cylinder forming a cavity provided with an inlet opening for receiving liquid recycled refrigerant from said storage means, and an outlet opening for discharging said liquid recycled refrigerant from the charging cylinder cavity, and wherein a means to prevent said cavity from being filled with said liquid recycled refrigerant above a pre-determined amount is operatively attached to said charging cylinder.

26. An assembly according to claim 25 wherein a heating means is operatively connected to said charging cylinder to heat said liquid recycled refrigerant in the charging cylinder cavity to a pre-determined temperature.

27. An assembly according to claim 26 wherein said heating means has sufficient heating capacity to heat said liquid recycled refrigerant in the charging cylinder cavity to at least 112° F. and is provided with a pressure limiting device to prevent said heating means from heating said liquid recycled refrigerant above about 112° F.

28. An assembly according to claim 7 or 17 wherein said storage means comprises:
(a) a tank forming said cavity, and
(b) tank cooling means operatively attached to said tank 29. An assembly according to claim 28 which further comprises a sealable, pressurized auxiliary storage means comprising:
(a) a container forming a cavity and provided with a sealable first opening operatively connected to said sealable outlet opening of said storage means and
(b) a valve assembly operatively connected to said first opening to permit liquid refrigerant to flow through said first opening or to seal said first opening upon a predetermined condition, and
(c) a line shutoff valve operatively attached to said valve assembly through which said liquid refrigerant flows.

30. An assembly according to claim 29 wherein:
(a) said container is further provided with a sealable second opening,
(b) a second valve assembly is operatively connected to said second opening to permit gaseous refrigerant to flow through said second opening, or to seal said second opening upon set conditions,
(c) a second line shutoff valve operatively attached to said second valve assembly through which said gaseous refrigerant flows from said container.

31. An assembly according to claim 28 wherein said tank cooling means comprise:
(a) a first solenoid valve operatively attached to said tank to allow said liquid recycled refrigerant from said sealable outlet opening to pass,
(b) an adjustable constant pressure externally equalized expansion valve having a high pressure opening operatively attached to said first solenoid valve and having a low pressure opening, and
(c) a length of tubing, a section of which is positioned in said cavity, one end of said tubing being operatively attached to said low pressure opening and the opposite end of said tubing being operatively connected to said compression chamber.

32. An assembly according to claim 6, 7 or 17 wherein said means to remove liquid and solid contaminates comprises:
(i) an oil separator operatively connectable to said air conditioning system to receive contaminated refrigerant from said air conditioning system and structured to remove oils from said contaminated refrigerant, and
(ii) a filter operatively connected to said oil separator to receive the treated refrigerant from said oil separator and structured to remove solid particles and moisture from said treated refrigerant to form said cleaned refrigerant gas stream.

33. An assembly according to claim 32 wherein said oil separator further comprises a closed container having a cavity for receiving said contaminated refrigerant, a stainless steel wool mesh screen positioned in said cavity at a location to cause contact with said contaminated refrigerant, a valve means operatively connected to the bottom section of said cavity to permit the drainage of any oil collected in said cavity, a heating means attached to said closed container to heat said contaminated refrigerant in said cavity, and an oil indicator means to indicate the amount of said oils contained in said oil separator.

34. An assembly according to claim 32 wherein said means to remove liquid and solid contaminates further comprises:
(iii) a valve assembly having a sealable first connection means attachable to said air conditioning system to receive said used refrigerant, and a sealable second connection means attachable to said oil separator to allow said used refrigerant to operatively pass to said oil separator, and a sealable third connection means.

35. An assembly according to claim 6, 7 or 17 which further comprises a shut-off switch having means to determine the level of said liquid cleaned refrigerant in said cavity and operatively connected to said compressor to prevent said compressor from operating either when said level is above a first pre-determined level or below a second pre-determined level.

36. An assembly according to claim 35 wherein a by-pass switch is operatively connected to said compressor to override the shutdown of the operation of said compressor by said shut-off switch.

37. An assembly according to claim 6, 7 or 17 wherein a moisture indicating means is operatively attached to said first cleaning assembly to receive said cleaned refrigerant gas stream from said first cleaning assembly and to indicate the presence of any moisture in said cleaned refrigerant gas stream.

38. An assembly according to claim 6, 7 or 17 wherein a compressor lubricating oil assembly operatively connected to said compressor, comprises:
(a) an oil separator-return means forming an oil collecting cavity provided with (i) an inlet opening operatively connected to said high pressure outlet to allow said cleaned refrigerant high pressure gas stream to enter said oil collecting cavity, (ii) a first outlet opening operatively connected to said compression chamber to allow oil separated from said cleaned refrigerant high pressure gas stream in said oil collecting cavity to be returned to said low pressure inlet of said compression chamber, and (iii) a second outlet opening to allow said cleaned refrigerant high pressure gas stream to pass from said oil collecting cavity; and
(b) a second cleaning assembly comprising means operatively connected to said oil separator to receive said cleaned refrigerant high pressure gas stream from said second outlet opening and to remove liquid and solid contaminates from said cleaned refrigerant high pressure gas stream in the event of an upset condition.

39. An assembly according to claim 38 wherein said means operatively connected to said oil separator-return means to receive said cleaned refrigerant high pressure gas stream from said second outlet opening and to remove liquid and solid contaminates from said cleaned refrigerant high pressure gas stream comprises:

(i) an oil separator operatively connectable to said oil separator-return means to receive cleaned refrigerant high pressure gas stream from said second outlet opening and structured to remove oils from said cleaned refrigerant high pressure gas stream, and
(ii) a filter operatively connected to said oil separator to receive treated refrigerant from said oil separator and structured to remove solid particles and moisture from the received cleaned refrigerant high pressure gas stream.

40. An assembly according to claim 6, 7 or 17 wherein a moisture indicating means is operatively attached to said condenser to receive said liquid cleaned refrigerant containing stream in a manner to indicate the presence of any moisture in said liquid cleaned refrigerant containing stream.

41. An assembly according to claim 6, 7 or 17 wherein a storage means to visually display the level of liquid recycled refrigerant in said cavity.

42. An assembly according to claim 41 wherein said liquid level indicating means is a sight glass.

43. An assembly according to claim 6, 7 or 17 which further comprises an auxiliary storage means comprising:
    (a) a container forming a cavity and provided with a sealable first opening operatively connected to said sealable outlet opening of said storage means and
    (b) a valve assembly operatively connected to said first opening to permit liquid refrigerant to flow through said first opening or to seal said first opening upon a predetermined condition, and
    (c) a line shutoff valve operatively attached to said valve assembly through which said liquid refrigerant flows from said container.

44. An assembly according to claim 43 wherein a heating means is operatively connected to said auxiliary storage means to heat any refrigerant in said auxiliary storage means.

45. An assembly according to claim 43 wherein a filter means is operatively connected between said sealable first opening and the cavity of said storage means to receive the refrigerant from the auxiliary storage means and is structured to remove solid particles and moisture from the refrigerant before it is discharged into the cavity of the storage means.

46. An assembly for recovering and recycling used refrigerant from an air conditioning system and recharging the recycled refrigerant to the same or another air conditioning system which comprises:
    (a) a first cleaning assembly comprising means to receive and then to remove liquid and solid contaminates from said used refrigerant to form a cleaned refrigerant gas stream;
    (b) a compressor, having a compression chamber with a low pressure inlet and a high pressure outlet, operatively connected at said low pressure inlet to said means to cause said used refrigerant to pass through said means, and then to cause said cleaned refrigerant gas stream to pass through said low pressure inlet into said compression chamber, and structured to compress said cleaned refrigerant gas stream to form a cleaned refrigerant high pressure gas stream and to force said cleaned refrigerant high pressure gas stream out of said compression chamber through said high pressure outlet;
    (c) a condenser operatively connected to said compressor to receive said cleaned refrigerant high pressure gas stream and having cooling means to condense said cleaned refrigerant high pressure gas stream to form a liquid cleaned refrigerant containing stream;
    (d) a storage means comprising:
        (i) a tank forming a cavity having a gas contaminate area located in the upper section of said cavity and having a liquid recycled refrigerant area located in the lower section of said cavity, said storage means having an inlet opening operatively connected to said condenser and positioned to receive said liquid cleaned refrigerant containing stream into said cavity so as to allow any liquid cleaned refrigerant in said liquid cleaned refrigerant containing stream to locate in said liquid recycled refrigerant area and to allow any gas contaminates in said liquid cleaned refrigerant containing stream to locate in said gas contaminate area, said storage means having a sealable outlet opening positioned to allow discharge of any liquid recycled refrigerant in said liquid recycled refrigerant area, and
        (ii) tank cooling means operatively attached to said tank to cool said cavity comprising a first solenoid valve operatively attached to said tank to allow said liquid recycled refrigerant from said sealable outlet opening to pass, an adjustable constant pressure externally equalized expansion valve having a high pressure opening operatively attached to said first solenoid valve and having a low pressure opening, and a length of tubing, a section of which is positioned in said cavity, one end of said tubing being operatively attached to said low pressure opening and the opposite end of said tubing being operatively connected to said compression chamber,
    (e) a purge means operatively connected to said storage means to purge at pre-determined times said gas contaminate area of at least some of said gas contaminates which may have collected in said cavity,
    (f) a metering means operatively connected by a third solenoid valve to said storage means to receive from said cavity through said sealable outlet opening at least some of said liquid recycled refrigerant, and to discharge through a three-way valve at a pre-determined density to said air conditioning system a pre-determined amount of the received liquid recycled refrigerant, and
    (g) an auxiliary storage means comprising:
        (i) a container forming a cavity and provided with a sealable first opening operatively connected to said sealable outlet opening of said storage means and
        (ii) a valve assembly operatively connected to said first opening to permit liquid refrigerant to flow through said first opening or to seal said first opening upon a pre-determined condition, and
        (iii) a line shutoff valve operatively attached to said valve assembly through which said liquid refrigerant flows from said container.

47. An assembly according to claim 46 wherein said metering means comprises a charging cylinder forming a cavity provided with an inlet opening for receiving liquid recycled refrigerant from said storage means, and an outlet opening for discharging said liquid recycled refrigerant from the charging cylinder cavity and having a first heating means operatively connected to said charging cylinder to heat said liquid recycled refrigerant in the charging cylinder cavity to a pre-determined temperature, and wherein a means to prevent said cavity from being filled with said liquid recycled refrigerant above a pre-determined amount is operatively attached to said charging cylinder.

48. An assembly according to claim 47 wherein said compressor, said first heating means, the condenser cooling means, and said first, second and third solenoid valves are electrically controlled; and wherein said assembly further comprises an electrical process control switch having separate switching positions operatively electrically connected to said compressor, said first heating means, said condenser cooling means, and said first, second and third solenoid valves to permit each operation performed by said assembly to be controlled by said electrical process control 49. An assembly according to claims 1, 6, 7, 17 or 46 which further comprises a manifold assembly having:
 (i) a manifold body provided with a sealable cavity for receiving refrigerant, said manifold body provided, with four sealable passageways which connect said sealable cavity to the outside surface of said manifold body,
 (ii) a first line having one of its ends attached to a first one of said four sealable passageways and having its opposite end attachable to a high pressure port of said air conditioning system in a manner to permit flow of refrigerant to and from said cavity to and from said high pressure port,
 (iii) a second line having one of its ends attached to a second one of said four sealable passageways and having its opposite end attachable to a low pressure port of said air conditioning system in a manner to permit flow of refrigerant to and from said sealable cavity to and from said low pressure port,
 (iv) a third line having one of its ends attached to a third one of said four sealable passageways and recycled refrigerant, and
 (v) a fourth line having one of its ends attached to a fourth one of said four sealable passageways and having its opposite end attachable to said first cleaning assembly.

50. An assembly according to claim 49 wherein said fourth line's opposite end is further attachable to a vacuum pump.

51. An assembly according to claim 49 wherein
 (a) a first three-way valve is operatively connected to said third line in a manner to permit flow of liquid recycled refrigerant from more than one source to said manifold assembly, and
 (b) a second three-way valve is operatively connected to said fourth line in a manner to permit flow of refrigerant from said manifold assembly to said first cleaning assembly or to a vacuum pump.

* * * * *